United States Patent [19]
Boatner et al.

[11] Patent Number: 5,298,329
[45] Date of Patent: Mar. 29, 1994

[54] ALKALI-LEAD-IRON PHOSPHATE GLASS AND ASSOCIATED METHOD

[75] Inventors: Lynn A. Boatner, Oak Ridge; Brian C. Sales, Knoxville, both of Tenn.; Sofia C. S. Franco, Santafé de Bogotá, Colombia

[73] Assignee: Martin Marietta Energy Systems, Inc., Oak Ridge, Tenn.

[21] Appl. No.: 875,224

[22] Filed: Apr. 28, 1992

[51] Int. Cl.$^5$ .............................................. B32B 15/04
[52] U.S. Cl. ................................. 428/432; 428/426; 428/433; 428/434; 428/469; 428/471; 428/472; 428/630; 428/631; 428/704; 428/212; 501/15
[58] Field of Search .......................... 501/15, 126, 45; 428/426, 432, 433, 434, 630, 631, 633, 472, 704, 212, 469, 471

[56] References Cited

U.S. PATENT DOCUMENTS

| | | | |
|---|---|---|---|
| 3,804,645 | 4/1974 | Lewis et al. | 106/50 |
| 4,071,658 | 1/1978 | Phillips | 428/677 |
| 4,277,716 | 7/1981 | Banks, Jr. | 428/434 |
| 4,649,085 | 3/1987 | Landram | 428/433 |
| 4,775,647 | 10/1988 | Smith, III | 501/15 |
| 4,847,008 | 7/1989 | Boatner et al. | 252/629 |
| 4,847,219 | 7/1989 | Boatner | 501/27 |
| 5,075,261 | 12/1991 | Yamanaka | 501/15 |
| 5,145,803 | 9/1992 | Daimer | 501/15 |

Primary Examiner—A. A. Turner
Assistant Examiner—Timothy M. Speer
Attorney, Agent, or Firm—Andrew S. Neely; J. Donald Griffin; Harold W. Adams

[57] ABSTRACT

A glass composition and method of preparation utilizes a mixture consisting of phosphorus oxide within the range of about 40 to 49 molar percent, lead oxide within the range of about 10 to 25 molar percent, iron oxide within the range of about 10 to 17 molar percent and an alkali oxide within the range of about 23 to 30 molar percent. The glass resulting from the melting and subsequent solidifying of the mixture possesses a high degree of durability and a coefficient of thermal expansion as high as that of any of a number of metals. Such features render this glass highly desirable in glass-to-metal seal applications.

3 Claims, 2 Drawing Sheets

ALKALI-LEAD-IRON PHOSPHATE GLASS AND ASSOCIATED METHOD

This invention was made with Government support under contract DE-AC05-84OR21400 awarded by the U.S. Department of Energy, Division of Material Sciences, to Martin Marietta Energy Systems, Inc. and the Government has certain rights in the invention

BACKGROUND OF THE INVENTION

This invention relates generally to glass composition and relates, more particularly, to a glass composition suitable for use in glass-to-metal seal applications.

In many seal applications, such as the construction of an electrical feedthrough involving glass-to-metal contact, the glass-to-metal seal must be vacuum-tight to maintain an effective separation between ambient and high vacuum conditions. However, the effectiveness of the seal could be jeopardized if the glass does not possess a high degree of chemical durability and a coefficient of thermal expansion which is high enough to match that of the metal with which the glass is used.

It is, accordingly, an object of the present invention to provide a new and improved glass composition for use in glass-to-metal seal applications which possesses both a high degree of chemical durability and a relatively high coefficient of thermal expansion, a method of making the glass, and a method for forming a glass-to-metal seal.

SUMMARY OF THE INVENTION

This invention resides in a glass composition and a method of making the glass, and an associated method of forming a glass-to-metal seal.

The glass composition is comprised of phosphorus oxide within the range of about 40 to 49 molar percent, lead oxide within the range of about 10 to 25 molar percent, iron oxide within the range of about 10 to 17 molar percent and an alkali oxide within the range of about 23 to 30 molar percent.

The method of making the glass includes the steps involved in preparing the composition. Such steps include the providing of a mixture consisting essentially of 10-25 molar percent lead oxide, 10-17 molar percent iron oxide, 40-49 molar percent ammonium dihydrogen phosphate and 23-30 molar percent alkali carbonate, melting the mixture together, and then solidifying the melt.

The method of forming a glass-to-metal seal includes the steps of providing the aforementioned glass composition mixture in powdered form, melting the mixture together, placing the melted mixture into contact with the surface of the metal with which the seal is formed, and then solidifying the melt.

DETAILED DESCRIPTION OF THE PREFERRED EMBODIMENT

Lead-ron phosphate glasses possess good chemical durability but do not possess coefficients of thermal expansion which are high enough to match the coefficients of thermal expansion of some metals, such as aluminum. It was discovered that the addition of alkali oxides to this lead-iron phosphate family of glasses resulted in alkali-lead-iron phosphate glass compositions with unusually high thermal expansion coefficients with no appreciable loss of chemical durability.

The preferred compositions of the alkali-lead-iron phosphate glass found to provide high thermal expansion coefficients and good chemical durability are set forth in the following table 1. The regions of the listed compositions fall within the glass-forming region of the quaternary-oxide phase field ($R_2O$—$PbO$—$Fe_2O_3$—$P_2O_5$, R=Cs, Rb, K, Na, Li) and its compositions provide a homogenous glass, as opposed to a glass-crystalline ceramic.

TABLE 1

| Compound | Molar Percentage |
| --- | --- |
| $PO_{2.5}$ | 40–49 |
| $PbO$ | 10–25 |
| $FeO_{1.5}$ | 10–17 |
| $RO_{0.5}$ (R = Cs, Rb, K, Na, Li) | 23–30 |

To prepare the glass and by way of example, appropriate amounts of lead oxide ($PbO$), iron oxide ($Fe_2O_3$), ammonium dihydrogen phosphate ($NH_4H_2PO_4$) and alkali carbonate ($R_2CO_3$ R=Cs, Rb, K, Na, Li) are mixed together in a powdered form. Ammonium dihydrogen phosphate (which decomposes to $P_2O_5$ at about 450° C.) and the alkali carbonates (which decompose to the oxide at about 700° C.) are used in preference to the oxides since some of the oxides (i.e., $P_2O_5$ and $R_2O$) are very hydroscopic and are more difficult to handle. The well-mixed powders are then melted together in a crucible comprised, for example, of aluminia ($Al_2O_3$), zirconia ($ZrO_2$) or platinum at temperatures between 950° and 1050° C. for periods of one to two hours.

When all of the aforedescribed powdered components were melted together, an appreciable amount of foaming could result. To circumvent the severity of the foaming, the temperature of the mix can be increased at a relatively slow rate during the melting operation. Alternately, the lead oxide, iron oxide and phosphate could be melted together in a preparatory step, ground into a powder and then the alkali carbonate subsequently added to the ground powder and melted together. The melted mixture is then permitted to cool to a solidified state.

Figure 1:
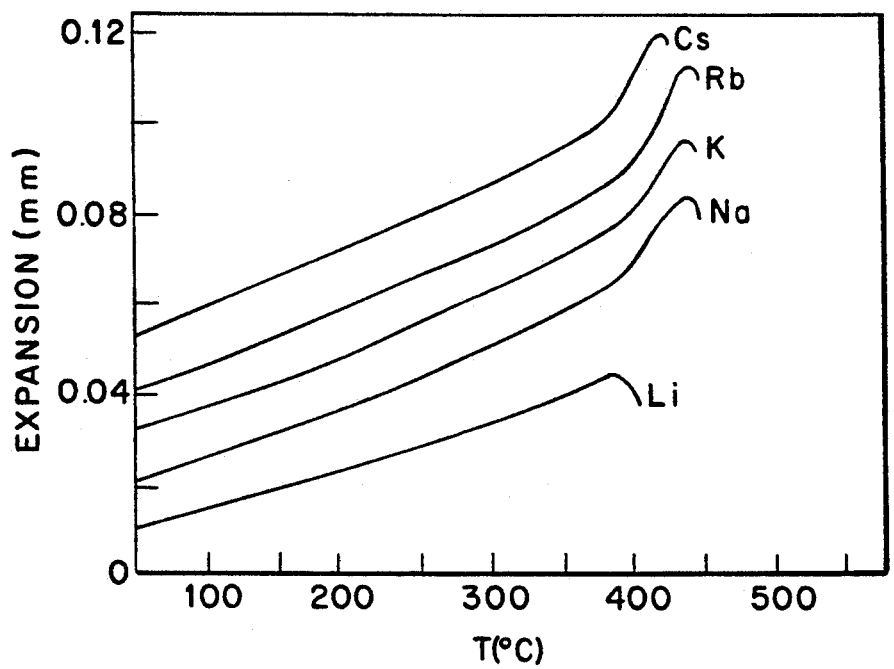
FIG. 1 is a graph of the thermal expansion curves for five glass samples embodying a composition of the present invention.

The coefficient of thermal expansion of five samples comprised of 30 $RO_{0.5}$, 15 $PbO$, 10 $FeO_{1.5}$, 45 $PO_{2.5}$, with R=Cs, Rb, K, Na and Li, were measured with a Perkin-Elmer Thermo-Mechanical analyzer, and the measured expansion curves for these five samples are shown in FIG. 1. Each of the five samples had an initial length at room temperature of 7.6±0.2 mm. The softening point of each sample can be identified as the temperature at which the thermal expansion curve passes through a maximum.

Figure 2:
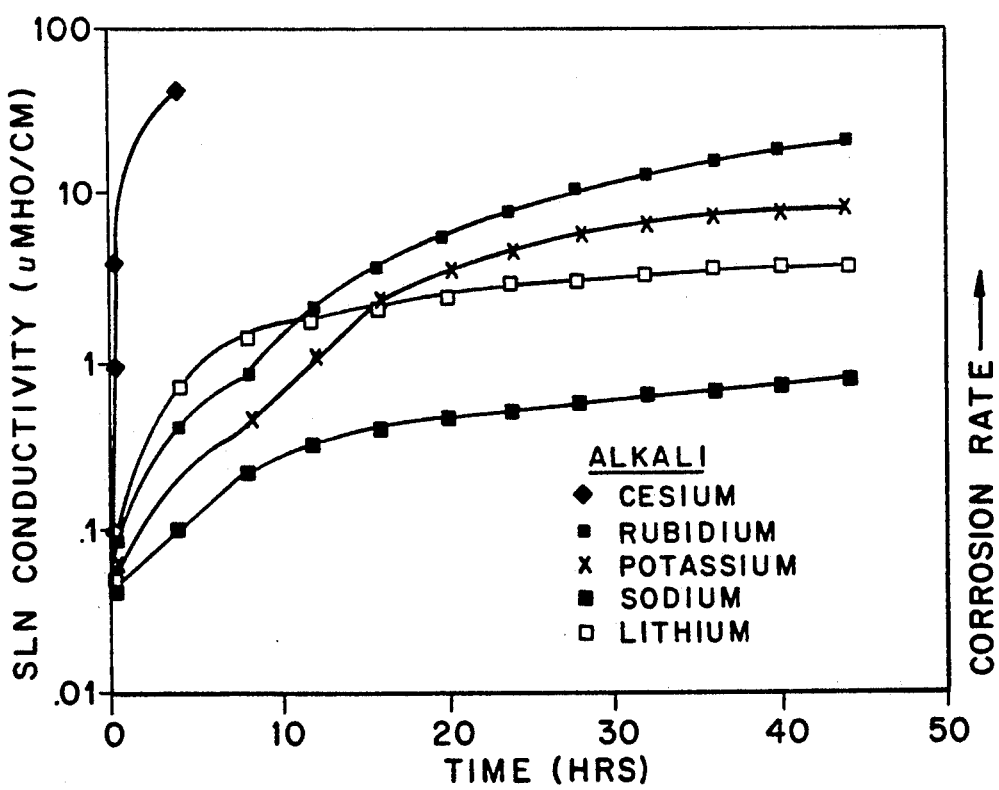
FIG. 2 is a graph illustrating plots of the solution conductivity versus time for glass compositions embodying features of the present invention.

The chemical durability of five unpolished glass slab samples, each measuring about $1.5 \times 0.5 \times 0.2$ cm$^3$ and comprised of 30 RO$_{0.5}$, 15 PbO, 10 FeO$_{1.5}$, 45 PO$_{2.5}$ with R=Cs, Rb, K, Na and Li were measured by way of a solution conductivity test. More specifically, each slab sample was suspended on a platinum wire in a Teflon ® container that was filled with approximately 100 cc of triply distilled water. The ratio of the surface area of the glass sample to the volume of water was about 0.025/cm, and the tests were performed under static (i.e. non-flowing) conditions. Qualitative aqueous corrosion rates were estimated by monitoring the increase in the solution conductivity as a function of time. This technique relies on the fact that, in the dilute limit, the increase in the solution conductivity is roughly proportional to the concentration of ions released from the glass. An increase in the normalized solution conductivity was obtained by dividing the measured solution conductivity (mho/cm) by the surface area of the glass sample. Solution conductivity measurements are a very sensitive means of measuring low corrosion rates and have the added advantage that the qualitative corrosion rates of several glass samples could be rapidly determined using a computer-controlled data acquisition system. This type of measurement is particularly useful in comparing the relative corrosion rates of a family of glasses (alkali-lead-iron phosphate, hereinafter ALIP) glasses where the compositions of the glasses are varied in a systematic manner. Qualitatively, a glass was considered to be corrosion resistant if the final solution conductivity per-square-cm of glass after two days of exposure to water at 90° C. was less than 10 $\mu$mho/cm. Typical solution conductivity data for the aforementioned five glass slab samples are shown in FIG. 2.

In addition to the solution conductivity measurements, a direct measure of the corrosion rate of each glass slab sample was obtained by measuring the change in the weight of each sample as a result of the two-day corrosion test. The normalized corrosion rate was then calculated by dividing the measured change in weight by the surface area of the glass sample and then by the total time (two days) that the sample was exposed to the solution. A good "low value" for the corrosion rate was considered to be about $10^{-8}$-$10^{-7}$ gms/cm$^2$-min. As a result of this two-day test, none of the samples tested exceeded this "low value".

It is well known that, in general, phosphate glasses are more susceptible to crystallization than are silicate glasses, and the tendency of phosphate glasses to crystallize frequently limits the size of the glass blocks that can be cast. In order to learn more about the crystallization characteristics of ALIP glass, a crystallization test was conducted on ALIP glass samples. In this connection, the critical cooling rate of a typical ALIP glass sample was measured with a Perkn-Elmer DTA 1700 differential analysis system. A small amount of the glass (about 100 mg) was placed in a platinum cup and heated to 900° C. for about thirty minutes. The glass was then cooled at a constant rate and the DTA signal was recorded. This procedure was repeated several times with the cooling rate being changed between procedures. These data indicate that this typical ALIP glass should be cooled through the temperature range of 475°-650° C. at a rate greater than about 5° C./min in order to avoid any bulk crystallization. This means it should be possible to cast an ALIP glass block approximately $10 \times 10 \times 10$ cm$^3$ without encountering any problems with crystallization.

In order to acquire thermal expansion and corrosion rate data, a number of specific glass compositions were investigated. To this end, each glass composition investigated was identified with a number between 101 and 511. The first digit (moving from left to right) determined which alkali oxide was used in the composition. More specifically, 1=Cs, 2=Rb, 3=K, 4=Na and 5=Li. The second two digits (01-11) determined the overall composition but without specifying which alkali oxide (RO$^{0.5}$) was used. These compositions (in mole percent) are given below.

TABLE 2

| Composition | RO$_{0.5}$ | PbO | FeO$_{1.5}$ | PO$_{2.5}$ |
| --- | --- | --- | --- | --- |
| 01 | 30 | 15 | 10 | 45 |
| 02 | 24 | 15 | 16.5 | 44.5 |
| 03 | 24 | 22 | 10 | 44 |
| 04 | 30 | 20 | 10 | 40 |
| 05 | 24 | 20 | 16 | 40 |
| 06 | 30 | 13 | 10 | 47 |
| 07 | 23 | 13 | 16 | 48 |
| 08 | 24 | 10 | 17 | 49 |
| 09 | 24 | 16 | 16 | 44 |
| 10 | 30 | 16.5 | 10.5 | 43 |
| 11 | 24 | 24 | 10 | 42 |

A summary of the thermal expansion data and corrosion data of the glass compositions listed in Table 2 is provided below in Table 3. The corrosion tests were conducted in distilled water at 90° C. for two days.

TABLE 3

| | Thermal expassion coefficients ($\times 10^{-6}$/°C.) | | | | Corrosion rate (90° C.) ($10^{-7}$ g/cm$^2$-min) |
| --- | --- | --- | --- | --- | --- |
| | Temperature range (°C.) | | | | |
| Composition | 50-100 | 100-150 | 150-200 | 200-250 | |
| 101 | 16.3 | 18.1 | 18.1 | 19.4 | 120 |
| 102 | 13.3 | 14.9 | 15.1 | 15.1 | 0.3 |
| 103 | 16.0 | 16.5 | 17.1 | 17.7 | 4.2 |
| 104 | 15.5 | 17.8 | 18.9 | 19.6 | 4000 |
| 105 | 16.6 | 18.3 | 18.6 | 19.8 | 0.4 |
| 106 | 14.8 | 16.8 | 18.4 | 18.5 | 520 |
| 107 | 10.2 | 13.3 | 13.5 | 14.5 | 0.7 |
| 108 | 13.1 | 13.8 | 14.5 | 15.6 | 0.8 |
| 109 | 14.4 | 15.6 | 16.4 | 16.5 | 1.0 |
| 110 | 17.4 | 18.6 | 19.7 | 19.9 | 1600 |
| 111 | 15.3 | 16.1 | 16.5 | 17.4 | 0.5 |
| 201 | 15.6 | 17.1 | 17.6 | 18.4 | 2.1 |
| 202 | 12.5 | 13.9 | 14.1 | 14.5 | 0.3 |
| 203 | 13.2 | 15.6 | 16 | 16.7 | 0.7 |
| 204 | 16.2 | 18 | 17.3 | 18.7 | 8.0 |

TABLE 3-continued

| | Thermal expassion coefficients ($\times 10^{-6}/°C.$) | | | | Corrosion rate (90° C.) ($10^{-7}$ g/cm$^2$-min) |
|---|---|---|---|---|---|
| | Temperature range (°C.) | | | | |
| Composition | 50–100 | 100–150 | 150–200 | 200–250 | |
| 205 | 13.2 | 15.2 | 15.3 | 15.8 | 0.1 |
| 206 | 15.1 | 16.6 | 16 | 17.1 | 4.0 |
| 207 | 10.5 | 12.3 | 12.4 | 12.6 | 0.8 |
| 208 | — | — | — | — | — |
| 209 | 12.8 | 13.7 | 13.7 | 15.2 | 1.0 |
| 210 | 15.6 | 18 | 18.1 | 18.5 | 7.0 |
| 211 | 13.8 | 16.2 | 16.2 | 17.2 | 0.2 |
| 301 | 15.1 | 16.4 | 17.2 | 18.6 | 1.0 |
| 302 | 12.6 | 13.7 | 15.3 | 15.2 | 0.6 |
| 303 | 13.5 | 14.9 | 15.1 | 16.2 | 0.3 |
| 304 | 15.2 | 16.3 | 17 | 18.1 | 0.7 |
| 305 | 13.5 | 14.5 | 14.9 | 14.9 | 0.7 |
| 306 | 14.9 | 17.1 | 17.4 | 18 | 1.0 |
| 307 | — | — | — | — | — |
| 308 | — | — | — | — | — |
| 309 | 11.5 | 13.3 | 14.7 | 14.5 | 0.8 |
| 310 | 14.7 | 16.5 | 17.6 | 19.2 | 0.2 |
| 311 | 13.2 | 15.1 | 15.8 | 16.8 | 1.2 |
| 401 | 13.3 | 15.1 | 16.4 | 17.6 | 0.4 |
| 402 | — | — | — | — | — |
| 403 | 13.1 | 14.4 | 15.6 | 16.3 | 1.0 |
| 404 | — | — | — | — | — |
| 405 | 12.4 | 13.3 | 14 | 15.6 | — |
| 406 | 12.8 | 15.1 | 15.9 | 17.4 | 0.2 |
| 407 | 11 | 13.4 | 13.9 | 14.5 | 1.1 |
| 408 | — | — | — | — | — |
| 409 | 11.7 | 13.1 | 13.8 | 14.6 | 0.8 |
| 410 | 13.3 | 15.2 | 16.2 | 18 | 2.0 |
| 411 | — | — | — | — | 0.7 |
| 501 | 10.7 | 12 | 12.4 | 13.5 | 0.6 |
| 502 | 9.2 | 11 | 11.6 | 11.2 | 0.4 |
| 503 | 11.1 | 11.7 | 12.7 | 13.7 | 0.2 |
| 504 | 10.2 | 11.9 | 12.8 | 13.6 | 0.6 |
| 505 | — | — | — | — | 0.7 |
| 506 | 10.1 | 12.4 | 13.5 | 14.1 | 1.0 |
| 507 | — | — | — | — | — |
| 508 | — | — | — | — | — |
| 509 | 9.3 | 10.7 | 11.5 | 12 | 0.9 |
| 510 | 10.6 | 12.8 | 13.4 | 14.3 | 0.9 |
| 511 | 11.1 | 12.2 | 13 | 13.9 | 1.1 |

The data in Table 3 can be used to select a glass composition for use in a glass-to-metal seal application. For example, if a particular metal with which the glass is to be used exhibits a known thermal expansion coefficient within a temperature range within which the seal is to be used, a glass composition can be selected from Table 3 which most closely exhibits the thermal-expansion characteristics of that particular metal for use with that metal.

DETAILED DESCRIPTION OF AN ILLUSTRATED EMBODIMENT

Figure 3:
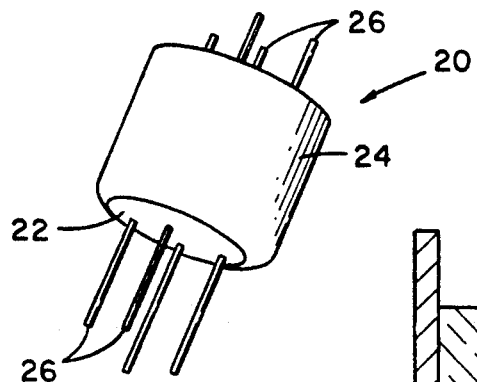
FIG. 3 is a perspective view of an embodiment of an electrical feedthrough within which the glass of the present invention is incorporated.
Figure 4:
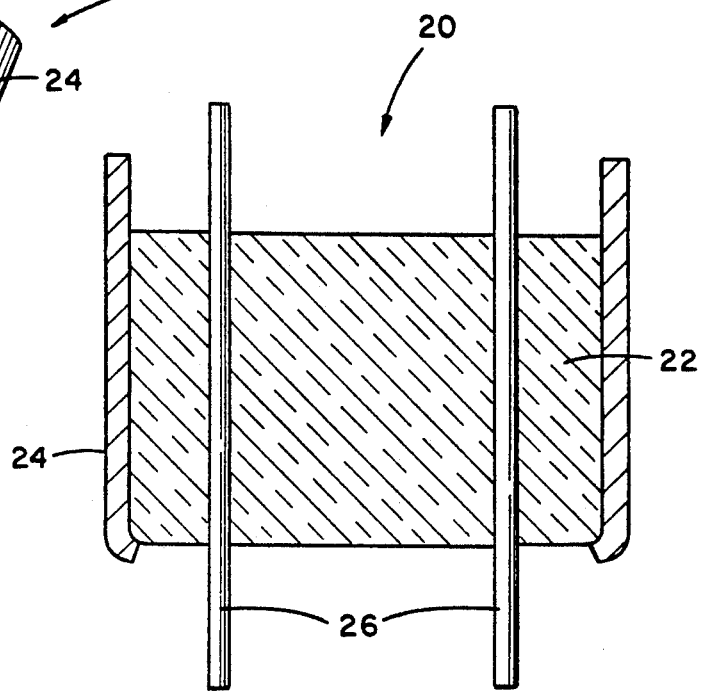
FIG. 4 is a longitudinal cross-sectional view of the feedthrough of FIG. 3

This invention has application in the semiconductor electronics industry and in the manufacture of vacuum components and military hardware. Specific examples of its application include its use in hermetic seals on relays and electrical feedthroughs. To demonstrate the feasibility of the fabrication of using ALIP glass in glass-to-metal seal applications, an electrical feedthrough 20 has been fabricated for conduction of electricity between, for example, an ambient environment and a high-vacuum environment. As best shown in FIGS. 3 and 4, the feedthrough 20 includes a body 22 comprised of glass incorporating features of the present invention, a cylindrical metal sleeve 24 positioned about the glass body 22 and four metal wires 26 extending through the glass body 22.

The metal sleeve 24 is comprised of aluminum, but other suitable metals can be used. The wires 26 may be comprised of any of several suitable electrically-conductive metals (plated or unplated), such as aluminum, iron, nickel, platinum, palladium and stainless steel. In the depicted feedthrough 20, the wires 26 are comprised of unplated copper.

Figure 5:
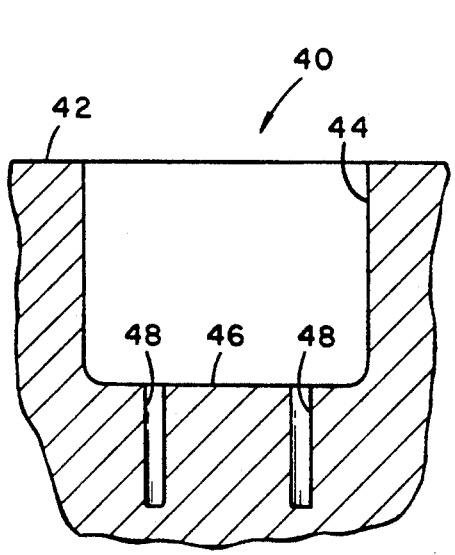
FIG. 5 is a fragmentary cross-sectional view of a jig within which the FIG. 3 feedthrough can be constructed.
Figure 6:
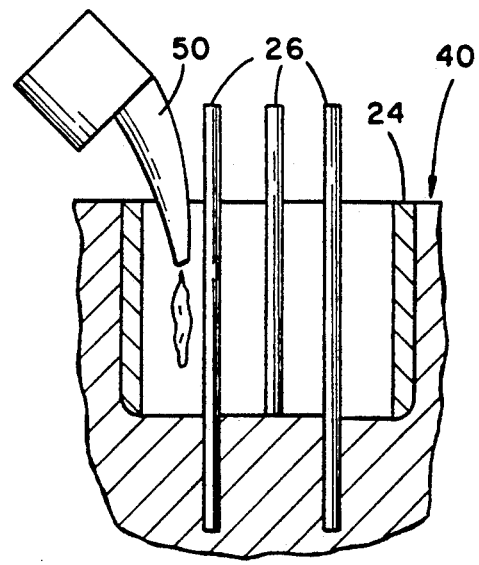
FIG. 6 is a view similar to that of FIG. 5 illustrating steps involved in the fabrication of the FIG. 3 feedthrough.

To construct the feedthrough 20 and with reference to FIGS. 5 and 6, a suitable jig 40 is constructed, for example, of boron-nitride or graphite. As best shown in FIG. 5, the jig 40 has an upper surface 42 having a large circular recess 44 provided therein for receiving the metal sleeve 24. The bottom 46 of the recess is machined and polished to a smooth, flat condition. Four small holes 48 (only two shown in FIG. 5) are drilled in the bottom of the recess 44 for closely accepting the wires 26. The diameter and depth of the holes 48 are sized in accordance with the diameter and length of the wires 26 so that when inserted therein, the wires 26 are supported vertically and extend out of the recess 44. Thereafter, the metal sleeve 24 is placed into the recess 44 and the wires 26 are inserted into the opening 48 as shown in FIG. 6. Following insertion of the sleeve 24 and wires 26 into the jig 40, the entire assembly comprised of the jig 40, metal sleeve 24 and wires 26 are heated in air to about 500° C. for about five to ten minutes.

The glass for the body 22 is prepared by mixing and melting the appropriate amounts of lead oxide, iron oxide, ammonium dihydrogen phosphate and alkali carbonate together as described above in connection with the preparation of the preferred embodiment. If desired, the alkali carbonate can be added to the powder ground from a preparatory frit comprised of the lead oxide, iron oxide and phosphate to reduce the likelihood of foaming. Upon melting of the powdered mixture in a crucible to a state at which the mixture can be poured (i.e., about 800° C.), the molten glass is then poured from the crucible with a narrow spout 50 into the metal sleeve 24 positioned within the jig 40 so that the glass flows around the wires 26 positioned therein. Although many glass compositions are too viscous to be easily poured, the molten glass in this example possesses a viscosity which permits the molten mixture to be easily poured. Preferably, care should be taken during the pouring step to avoid pouring the molten glass directly on the wires 26. The assembly comprised of the jig 40, metal sleeve 24, wires 26 and the glass positioned in the jig 40 is then placed in an oven and annealed (350°–400° C.) for about thirty minutes. Upon cooling of the assembly over a time period of several hours so that the glass hardens to a hardened state, the feedthrough 20 is removed from the jig 40.

It will be understood that numerous modifications can be had to the foregoing embodiment without departing from the spirit of the invention. For example, the aforedescribed process has been used successfully preparing glass-to-metal seal electrical feedthroughs using sleeves made of aluminum (plated with nickel, gold or unplated), stainless steel (nickel plated or unplated) and copper (nickel-plated or unplated). Moreover, in addition to the feedthrough 20 having four wires 26, feedthroughs with two, three, five and six electrical conductors were fabricated with the aforedescribed process. Prototype feedthroughs prepared in this manner were tested for leaks with a Veeco Split-Sector Leak Station MS12-AB-R. The instrument was calibrated to $5 \times 10^{-12}$ atm-cc/sec leak sensitivity before actual testing. The seals of the prototype were considered to be excellent and had leak rates to helium gas between $10^{-8}$ and $10^{-10}$ atm-cm/sec. Accordingly, the foregoing description is intended for the purpose of illustration and not as limitation.

We claim:

1. In a glass-to-metal seal application including a metal surface against which the glass is in contact, the improvement comprising:

a composition of glass consisting essentially of about 40 to 49 molar percent phosphorus oxide, about 10 to 25 molar percent lead oxide, about 10 to 17 molar percent iron oxide and about 23 to 30 molar percent alkali oxide which have been mixed and melted for placement in contact with a metal surface to provide the glass with a coefficient of thermal expansion between about $9 \times 10^{-6}$/°C. and about $20 \times 10^{-6}$/°C. which approximates that of said metal surface.

2. The improvement of claim 1 wherein the phosphorus oxide within the glass composition is about 45 molar percent, the lead oxide within the glass composition is about 15 molar percent, the iron oxide within the glass composition is about 10 molar percent, and the alkali oxide within the composition is about 30 molar percent.

3. In a glass-to-metal seal application having a metal surface against which the glass is in contact and forms a seal, the improvement comprising:

a composition of glass comprising about 40 to about 49 molar percent phosphorus oxide, about 10 to about 25 molar percent lead oxide, about 10 to about 17 molar percent iron oxide and about 23 to about 25 molar percent alkali oxide which have been mixed and melted for placement in contact with a metal surface to provide the glass with a coefficient of thermal expansion between about $9 \times 10^{-6}$/°C. and about $20 \times 10^{-6}$/°C. that approximates the coefficient of thermal expansion of the metal surface against which the glass is in contact.

* * * * *